(12) United States Patent
Yates et al.

(10) Patent No.: US 6,324,497 B1
(45) Date of Patent: Nov. 27, 2001

(54) TAPE DRIVE EMULATION SYSTEM INCLUDING TAPE LIBRARY INTERFACE

(75) Inventors: Neville Yates, Los Gatos; Don Doerner, Foster City; Larry Korbus, Santa Cruz; Stephen J. Moore, San Jose, all of CA (US)

(73) Assignee: Sutmyn Storage Corporation, Santa Clara, CA (US)

( * ) Notice: Subject to any disclaimer, the term of this patent is extended or adjusted under 35 U.S.C. 154(b) by 0 days.

(21) Appl. No.: 09/116,150

(22) Filed: Jul. 15, 1998

(51) Int. Cl.[7] .................................................. G06F 9/455
(52) U.S. Cl. ..................................................... 703/24
(58) Field of Search .................... 395/500.45; 703/23–24

(56) References Cited

U.S. PATENT DOCUMENTS

| | | | |
|---|---|---|---|
| 4,467,421 | 8/1984 | White .................................. | 364/200 |
| 5,297,124 | * 3/1994 | Plotkin et al. ......................... | 369/32 |
| 5,398,142 | * 3/1995 | Davy .................................... | 707/206 |
| 5,455,926 | * 10/1995 | Keele et al. ............................ | 711/4 |
| 5,761,680 | * 6/1998 | Cohen et al. ......................... | 707/206 |
| 5,805,864 | 9/1998 | Carlson et al. ....................... | 395/500 |
| 5,809,511 | 9/1998 | Peake .................................... | 707/204 |
| 5,870,732 | 2/1999 | Fisher et al. .......................... | 707/1 |
| 5,963,971 | * 10/1999 | Fosler et al. .......................... | 711/114 |
| 6,052,765 | * 4/2000 | Blendermann et al. .............. | 711/165 |

* cited by examiner

Primary Examiner—Kevin J. Teska
Assistant Examiner—Hugh Jones
(74) Attorney, Agent, or Firm—Townsend and Townsend and Crew LLP

(57) ABSTRACT

An improved virtual tape storage device that utilizes a standard tape library coupled to the host to destage virtual volumes to reclaim space in the virtual storage system.

2 Claims, 5 Drawing Sheets

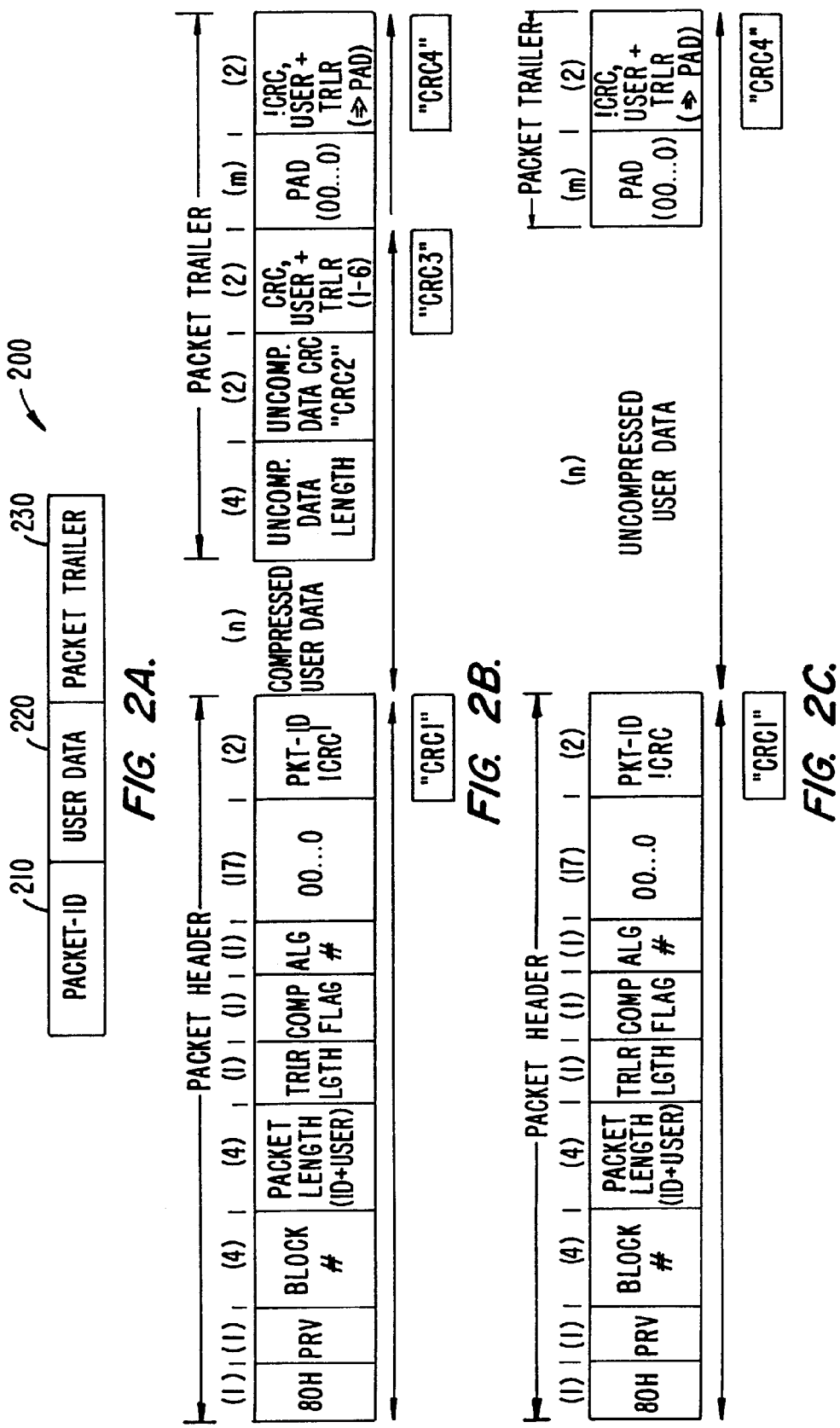

TAPE DRIVE EMULATION SYSTEM INCLUDING TAPE LIBRARY INTERFACE

BACKGROUND OF THE INVENTION

The present invention relates to storage systems, and in particular, to a method and apparatus for storing data on a virtual tape storage system.

A virtual tape storage system is a hardware and software product configured to interact with a host computer. Application programs running on the host computer store data output on tape volumes for storage. These tape volumes are embodied in the virtual tape storage system as virtual volumes on virtual tape drives (VTD). A virtual volume is a collection of data, organized to appear as a normal tape volume, residing in the virtual tape storage system. To the host computer and to the application programs, the tape volume contents appear to be stored on a physical tape device of a particular model, with the properties and behavior of that model emulated by the actions of the virtual tape storage system. However, the data may actually be stored as a virtual volume on any of a variety of different storage mediums such as disk, tape, or other non-volatile storage media, or combinations of the above. The virtual volume may be spread out over multiple locations, and copies or "images" of the virtual volume may be stored on more than one kind of physical device, e.g., on tape and on disk.

When an image of the virtual volume is stored on disk, different portions of the volume's contents may be stored on different disk drives and on different, non-contiguous areas of each of the disk drives. The virtual tape storage system maintains indexes which allow the contents of any virtual volume whose image is stored on disk to be read by the host, the virtual tape storage system retrieving scattered parts as needed to return them in correct sequence.

When an image of a virtual volume is stored on tape, it may be stored on a single tape together with images of other virtual volumes, or different parts of the image may be stored on more than one different tape with each part again placed with images, or parts of images, of other virtual volumes. In both of these approaches to tape storage of virtual volume images, the images are said to be "stacked." The virtual volume images may be stored on a variety of different tape device models other than the one being emulated. As with images stored on disk, the virtual tape storage system maintains indexes which allow it to retrieve the contents of any virtual volume stored in a stacked image from the tape or tapes on which it is stored.

A shortcoming of storing stacked images on tape arises because the stacked image is not recognizable by standard hardware and application programs.

Existing virtual storage systems include proprietary tape drive units for destaging virtual volumes from staging disks to tape. If, as is usually the case, the customer has already invested in tape library hardware the addition of a virtual tape drive system requires adding additional tape drive resources to perform destaging operations for the virtual tape drive system.

Thus, an improved virtual tape system and methods for its operation that overcomes the shortcomings of the presently available devices is needed.

SUMMARY OF THE INVENTION

According to one aspect of the present invention, a virtual library manager (VLMAN) subroutine, part of a Library Management System (LMS) running on the host computer, interfaces the virtual storage system and the host computer. VLMAN interacts with software provided with the existing tape library to access physical tape volumes mounted on tape drives in tape library.

According to another aspect of the invention, the contents of virtual volumes staged on staging disks on the virtual tape server may be destaged to the physical tapes mounted on the tape library to reclaim space in the virtual tape server.

Other features and advantages of the invention will be apparent in view of the following detailed description and appended drawings.

BRIEF DESCRIPTION OF THE DRAWINGS

FIG. 2a is a representation of a packet;

FIG. 2b is a representation of packet contents for compressed user data;

FIG. 2c is a representation of packet contents for uncompressed user data;

DETAILED DESCRIPTION OF THE PREFERRED EMBODIMENTS

Figure 1A:
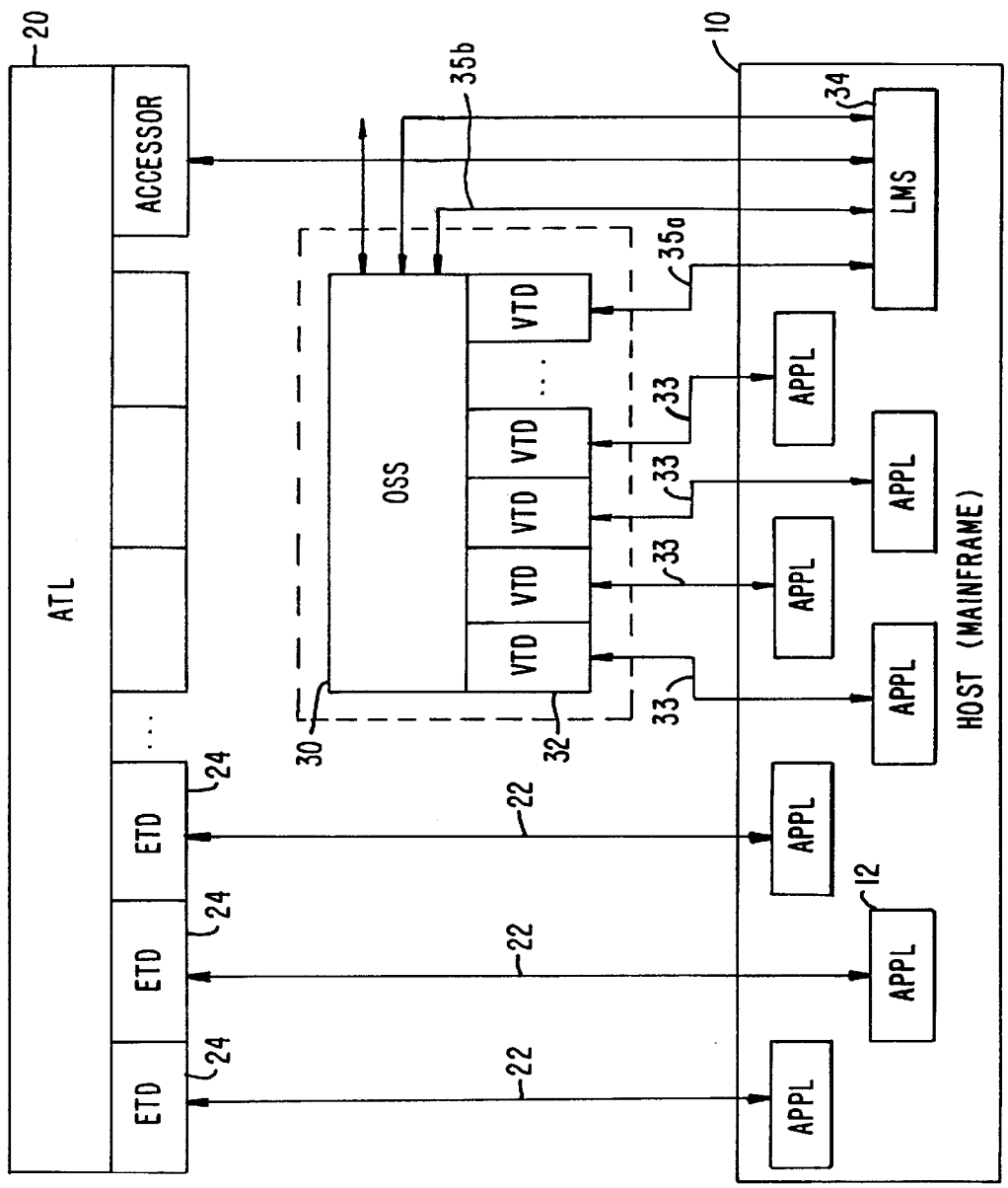
FIG. 1A is a conceptual block diagram of a preferred embodiment of the invention.

A preferred embodiment will now be described with reference to the figures, where like or similar elements are designated with the same reference numerals throughout the several views.

FIG. 1A is a high-level block diagram of a digital system in which a preferred embodiment of a virtual tape storage system of the present invention is utilized. In FIG. 1A, a host computer 10, for example an IBM mainframe computer, executes a plurality of applications 12. In practice, host computer 10 typically runs the MVS operating system manufactured by IBM, although other operating systems are well known to one of skill in the art and may also be used. MVS provides I/O services to various applications 12 including I/O for a tape unit 20, which may be an automatic tape library (ATL), or other type of tape storage device. Applications 12 may be coupled directly to tape unit 20 through ESCON tape devices (ETD) 24 by means of a physical interface such as an ESCON 3490 Magnetic Tape Subsystem Interface 22. MVS, the ESCON interface 22, and the host computer 10 are well-known in the art.

Applications 12 may also be coupled to a virtual tape server 30, also referred to herein as an open system server (OSS). OSS is manufactured by the assignee of the present invention. Virtual tape server 30 maintains virtual tape drives 32 (VTDs), which emulate the physical ETDs like those at 24. More details of the VTDs 32 will be presented below. The interface between an application 12 and a VTD 32 is OSS Emulated Device interface 33, which in the preferred embodiment is an ESCON interface.

A library management system (LMS) software module 34 also resides on host 10 and provides services to MVS and virtual tape server 30. LMS 34 is responsible for management of the tape library environment and performs such tasks as fetching and loading cartridges into drives, returning unloaded cartridges to their home locations, etc. The interface between LMS 34 and virtual tape server 30 is the Library Manager Interface with paths 35a and 35b based on two different and distinct protocols.

VTD 32 is a non-physical device that responds as if it were a physical device. In the currently described embodiment, the emulated physical device is an IBM-3490 tape drive, although other devices may also be emulated. VTD 32 responds to commands issued on a channel in the same fashion as the emulated technology. Thus, the absence of a physical tape device may be unknown to application 12.

Applications 12 typically store data in tape volumes. Tape volumes are well-known data structures. A "virtual volume" is a collection of data and metadata that, taken together, emulate a real tape volume. When "mounted" on a VTD, these virtual volumes are indistinguishable from real tape volumes by the host computer. In this context, "data" refers to data output by the host to be stored on tape and "metadata" refers to information generated by virtual tape server 30 which permits the emulation of real tape drives and volumes.

Figure 1B:
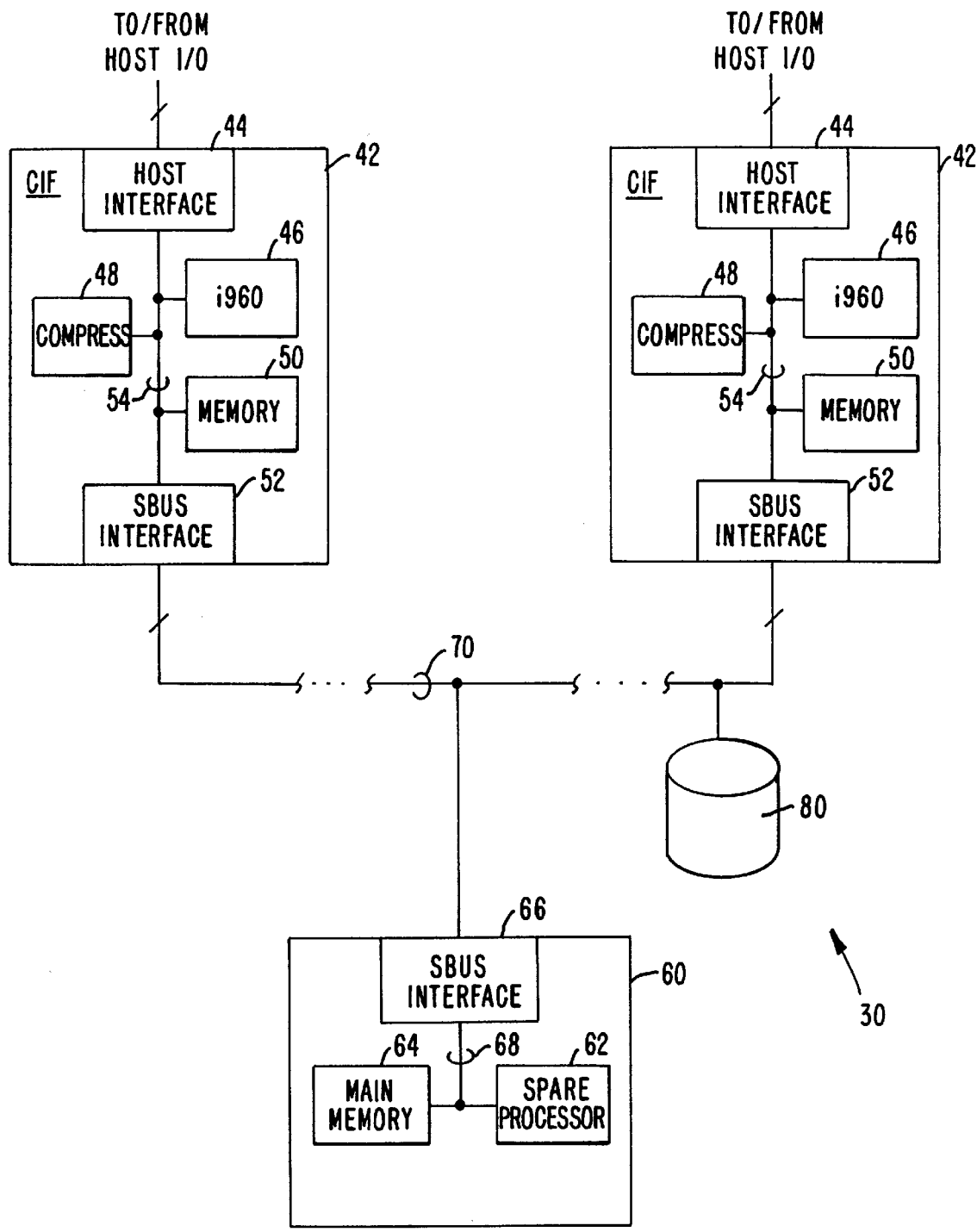
FIG. 1B is a block diagram of a preferred embodiment of a tape drive emulating (TDE) system according to the present invention.

FIG. 1B is a high level block diagram of a part of virtual tape server 30 utilizing an embodiment of the present invention that may be coupled to one or more host computers 10 (FIG. 1A). Host computers 10 are typically large mainframe computers running an operating system such as MVS, and various application programs.

A plurality of channel interfaces (CIFs) 42 are coupled to host I/O channels (not shown) to transfer data between host 10 and virtual tape server 30.

Each CIF 42 includes a host interface 44, an embedded server 46, a data formatter 48 for performing data compression and other functions, a buffer memory 50, an SBUS interface 52, and an internal bus 54. In the preferred embodiment, the embedded processor 46 is a model i960 processor manufactured by Intel Corporation.

A main controller 60 is coupled to CIFs 42 and includes a main processor 62, a main memory 64, an SBUS interface 66, and an internal bus 68. In the preferred embodiment, the main processor is a SPARC computer manufactured by Sun Microsystems, Incorporated. CIFs 42 and main controller 60 are coupled together by a system bus 70, which is an SBUS in the preferred embodiment.

Virtual tape server 30 stores host data in virtual volumes mounted on VTDs 32. In one preferred embodiment, the data is originally stored on staging disks 80. Because virtual tape server 30 must interact with the host as if the data were actually stored on physical tape drives, a data structure called a virtual tape drive descriptor is maintained in main memory 64 for each VTD 32. The virtual tape drive descriptor contains information about the state of the associated VTD 32. Additional structures, including a virtual tape "volume" structure and other structures subordinate to it, register the locations at which data is physically stored, among other information.

Subsequently, data may be transferred from staging disks 80 to one or more magnetic tape units. As mentioned above, tape units 20 may be individual tape units, automatic tape libraries (ATLs), or other tape storage systems. However, the location and other properties of the data is still defined in terms of the virtual tape volume structures in memory and stored in a disk-based control data set.

An example will help clarify the meaning of the terms. If application 12 intends to write data to tape, it requests that a tape be mounted on a tape drive. LMS intercepts the request and causes a virtual volume to be mounted on one of the VTDs 32 to receive the application output, which is delivered by the ordinary tape output programs of the MVS operating system. Blocks of data received by virtual tape server 30 are "packetized", the packets are grouped together in clusters with a fixed maximum size, called "extents", and the extents are written to staging disks 80 in virtual tape server 30. The staging disk space is treated as collections, called regions, of fixed-size space units called extents. Thus, data stored or to be stored in an extent is transferred between the controller and the staging disks during staging disk read/write operations.

Often the extents containing data from one virtual tape are scattered over several disk drives. All information about the packetization, such as packet grouping in extents and extent storage locations, required to reassemble the volume for later use by the host is metadata. Part of the metadata is stored with each extent and part is stored on non-volatile storage in virtual tape server 30, separate from the extent storage.

Data transferred from a host to a tape drive is sequential. The packets are stored in an extent in order sequentially by block number. A system for serializing packets is disclosed in the commonly-assigned co-pending application entitled "Data Serialization", filed Jun. 17, 1998 Ser. No. 09/098, 444.

Formatting a data block under this method produces a "packet" 200 as shown in FIG. 2. Packet 200 has a header 210 that includes, for example, a Packet-Id, user-data 220, and a trailer 230. Packet 200 is shown in more detail in FIGS. 2b and 2c. Packet 200, which may conform, for example to ANSI standards X3.224-1994 and X3.225-1994, contains a version of the hosts data block, compressed or, optionally not compressed, and descriptive control information such as the sequential number of the block in the sequence of all blocks written to a virtual tape volume, the lengths of the block, before and after compression, flags signaling whether compression was used and which of allowable compression algorithms was used, and calculated "CRC" check characters useful for verifying that packet 200, when transmitted from one storage system component to another, survived without corruption. In other words, the parts of packet 200 make the formatted block substantially self-describing.

In the present invention, data sets stored on virtual volumes are destaged from the staging disks to the existing tape library attached to the host. Accordingly, the user's existing resources are utilized and no redundant investment in additional tape drive libraries is require. In the preferred embodiment the data sets are stacked on tapes in an existing tape library coupled to the host computer and accessed by standard programs resident on the host.

The LMS software module includes a virtual library manager (VLMAN) submodule. VLMAN includes hooks to the host's existing tape drive accessing methods. When data must be destaged from OSS, VLMAN requests access to the host's tape libraries. Read (for reading data from the OSS) or write (for writing it to tape) directives are then issued from VLMAN to the host which executes the utilizing existing software.

Figure 3A:
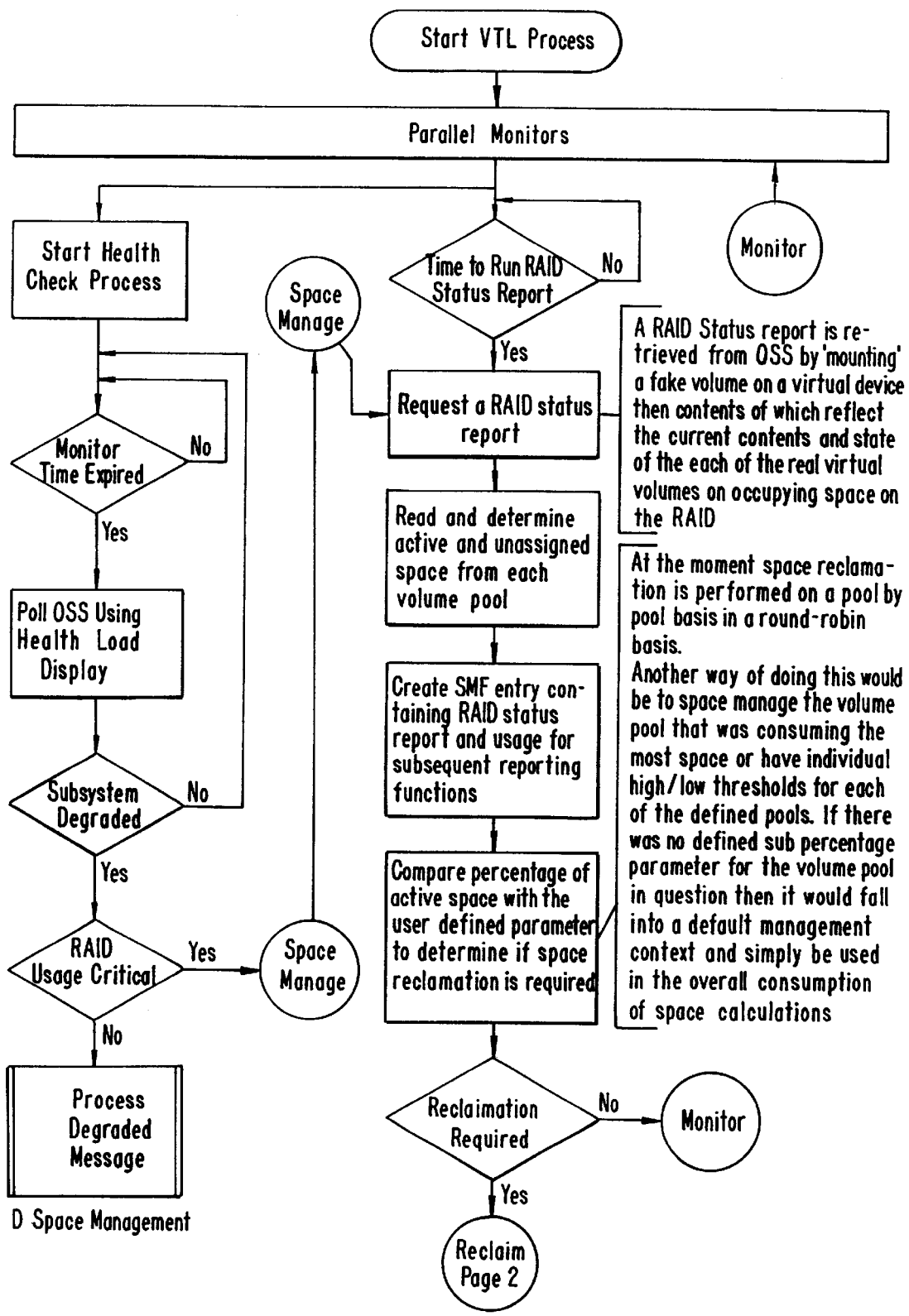
FIGS. 3a and b are flow charts of steps performed by an embodiment of the present invention.

A preferred embodiment of the invention will now be described with reference to the flow charts of FIGS. 3a and 3b. The virtual tape library process (VTL) runs several monitor routines in parallel. A Start Health Check Process monitors the system for subsystem degradation. If RAID usage is critical a space manage routine is started. The space manage routine is also started periodically, on fixed time intervals.

The space manage routine Requests a RAID status report. In a preferred embodiment this report is generated by mounting an administrative volume as described in a commonly assigned copending application entitled "IMPROVED INTERFACES FOR AN OPEN SYSTEMS SERVER PROVIDING TAPE DRIVE EMULATION" Ser. No. 09/111,691, filed Jul. 8, 1998.

The active and unassigned space from each virtual volume pool is read and an SMF (system management facility) entry containing RAID status report and usage is created for subsequent reporting functions. The percentage of active space is compared with a user defined parameter to determine whether space reclamation is required.

Figure 3B:
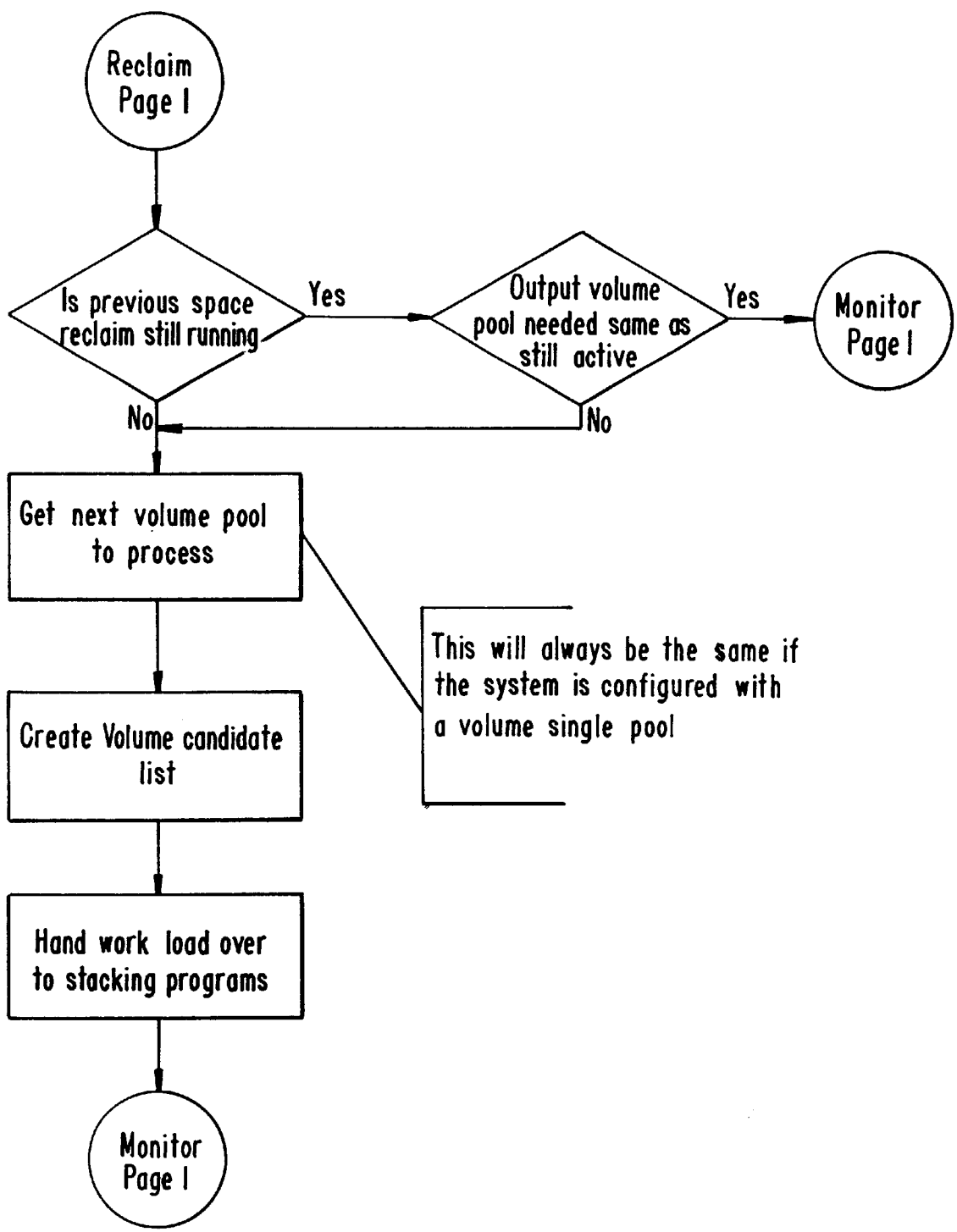

The steps for space reclamation are set forth in FIG. 3b. First it is determined whether a previous space reclaim is still running. If not, the reclaim process gets the next virtual volume pool to process. A volume candidate list for reclamation is created and work is handed over to stacking programs of VLMAN.

These stacking programs use the tape library programs already on the host, under control of VLMAN, to read data sets from virtual volumes in the OSS and write them to the physical tapes mounted on the physical tape drives in the tape library.

While the above is a complete description of specific embodiments of the invention, various modifications, alternative constructions, and equivalents may be used. Therefore, the above description should not be taken as limiting the scope of the invention as defined by the claims.

What is claimed is:

1. In a host computer system including host-controlled tape drives and having host onboard tape drive accessing procedures for accessing host-controlled tape drives, a method for management of disk storage of virtual volumes created by a virtual storage system that emulates host-controlled tape storage drives, with data output by the host to be stored on host-controlled tape drives converted by the virtual storage system from an emulated format, compatible with host-controlled tape storage, to a virtual storage system format that facilitates storage on virtual storage system staging disks, said method comprising the acts of:

if unused staging disk capacity in the virtual storage system has reached a low level;

identifying utilized staging disk storage space to be reclaimed;

utilizing host onboard tape drive accessing procedures to read data from the virtual storage system to obtain data, in the virtual storage system format, from staging disk storage space to be reclaimed;

utilizing host onboard tape accessing procedures to write data, in the virtual storage system format, read from staging disk storage to be reclaimed to a host-controlled tape drive;

updating virtual storage system meta-data to record addresses of host-controlled tape storage where data from staging disk storage space to be reclaimed is stored on the host-controlled tape storage;

monitoring the host to determine whether the host requests data which has been transferred from virtual storage staging disks to host-controlled tape storage;

if yes, utilizing host onboard tape drive accessing procedures, to read requested data, in the virtual storage system format, from host-controlled tape storage;

utilizing host on-board tape drive accessing procedures to write data, in the virtual storage system format, to the virtual storage system to be stored on said staging disks.

2. The method of claim 1 further comprising the acts of:

periodically conducting an audit to determine whether staging disk storage space has reached a specified low level.

* * * * *